US007363429B2

(12) United States Patent
Wu et al.

(10) Patent No.: US 7,363,429 B2
(45) Date of Patent: Apr. 22, 2008

(54) SYSTEM AND METHOD FOR CACHING DIRECTORY DATA IN A NETWORKED COMPUTER ENVIRONMENT

(75) Inventors: Vincent Wu, Irvine, CA (US); Silvy Wilson, Rancho Santa Margarita, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 380 days.

(21) Appl. No.: 10/768,832

(22) Filed: Jan. 29, 2004

(65) Prior Publication Data

US 2005/0172078 A1 Aug. 4, 2005

(51) Int. Cl.
*G06F 00/12* (2006.01)
*G06F 12/00* (2006.01)

(52) U.S. Cl. ..................... 711/133; 711/118
(58) Field of Classification Search ............... 711/118, 711/133
See application file for complete search history.

(56) References Cited

U.S. PATENT DOCUMENTS

| 5,922,074 | A | 7/1999 | Richard et al. |
| 5,944,789 | A | 8/1999 | Tzelnic et al. |
| 5,948,062 | A | 9/1999 | Tzelnic et al. |
| 6,014,667 | A | 1/2000 | Jenkins et al. |
| 6,073,129 | A | 6/2000 | Levine et al. |
| 6,073,141 | A | 6/2000 | Salazar |
| 6,263,367 | B1 | 7/2001 | Chu et al. |
| 6,347,312 | B1 | 2/2002 | Byrne et al. |
| 6,463,509 | B1 * | 10/2002 | Teoman et al. ............. 711/137 |
| 6,470,426 | B2 | 10/2002 | Burnett |
| 6,539,382 | B1 | 3/2003 | Byrne et al. |
| 6,584,502 | B1 * | 6/2003 | Natarajan et al. ........... 709/224 |
| 6,629,132 | B1 | 9/2003 | Ganguly et al. |
| 6,708,170 | B1 * | 3/2004 | Byrne et al. ................... 707/9 |
| 2002/0078301 | A1 | 6/2002 | Burnett |
| 2002/0095497 | A1 * | 7/2002 | Satagopan et al. .......... 709/225 |
| 2002/0112121 | A1 * | 8/2002 | Gerszberg et al. .......... 711/118 |
| 2003/0065874 | A1 | 4/2003 | Marron et al. |
| 2003/0074429 | A1 | 4/2003 | Gieseke et al. |
| 2003/0074430 | A1 | 4/2003 | Gieseke et al. |
| 2003/0212863 | A1 | 11/2003 | Ganguly et al. |
| 2003/0225746 | A1 | 12/2003 | Braun et al. |
| 2004/0002960 | A1 | 1/2004 | Drake et al. |

* cited by examiner

*Primary Examiner*—Woo H. Choi
(74) *Attorney, Agent, or Firm*—Tucker Ellis & West LLP

(57) ABSTRACT

This invention is directed to a system and method for caching directory data in a networked computer environment. More particularly, this invention is directed to a system and method for caching directory data in a networked computer environment using a lightweight directory access protocol server to retrieve the selected directory data and caching the selected directory data in a directory cache.

31 Claims, 4 Drawing Sheets

to be continued …

SYSTEM AND METHOD FOR CACHING DIRECTORY DATA IN A NETWORKED COMPUTER ENVIRONMENT

FIELD OF THE INVENTION

This invention is directed to a system and method for caching directory data in a networked computer environment. More particularly, this invention is directed to a system and method for caching directory data in a networked computer environment using a lightweight directory access protocol server to retrieve the selected directory data and caching the selected directory data in a directory cache.

In today's office environments, users are frequently distributed over large areas. They can be located in different floors of a large building, or in different locations around the country, or around the world. In such distributed systems, a central directory server may be physically located in a remote geographic area. A single server will that serves a large number of users will also be prone to delays when forced to respond to frequent queries for contact information, electronic mail addresses, or the like.

One possible solution for addressing the afore-noted problem would be by employing a faster server, which will result in increased equipment cost. Similarly, use of a faster data communication network, if possible, will also likely increase cost. It is undesirable to have more than one master directory, since to do so would require multiple updates in the event that user information is modified, as it would be when contact information changes, or if users are added or deleted.

The subject invention addresses the above-mentioned problems, and provides a cached directory system that allows for improved address queries, and provides a mechanism by which data integrity between the main directory and caches thereof is maintained through a disclosed cache updating system.

SUMMARY OF THE INVENTION

In accordance with the present invention, there is provided a system and method for caching directory data in a networked computer environment which uses a lightweight directory access protocol server to retrieve the selected directory data and caches the selected directory data in a directory cache.

Further, in accordance with the present invention, there is provided a system and method for caching directory data in a networked computer environment which improves the efficiency and speed of retrieving directory data.

Still further, in accordance with the present invention, there is provided a system for caching directory data in a networked computer environment. The system comprises a timer data storage, which timer data storage includes means adapted for storing data representative of a selected, periodic cache renewal period, and means adapted for receiving temporal data representative of elapsed time. The system also comprises testing means adapted for testing the temporal data against the timer data, the testing means including means adapted for outputting a cache renewal signal in accordance with an outcome of the testing and a directory cache. The system further comprises a cache refresh means adapted for selectively retrieving selected directory data from a first selected directory into the directory cache and means adapted for enabling the cache refresh means in accordance with the cache renewal signal.

Still further, in accordance with the present invention, there is provided a method for caching directory data in a networked computer environment. The method comprises the steps of storing data representative of a selected, periodic cache renewal period in a timer data storage area, receiving temporal data representative of elapsed time, and testing the temporal data against the timer data. The method also comprises the steps of outputting a cache renewal signal in accordance with an outcome of the testing, selectively retrieving selected directory data from a first selected directory into a directory cache, and enabling the retrieval of the selected directory data in accordance with the cache renewal signal.

These and other aspects, features, and advantages of the invention will be understood by one skilled in the art upon reading and understanding the specification.

DETAILED DESCRIPTION OF THE PREFERRED EMBODIMENTS

Figure 1:
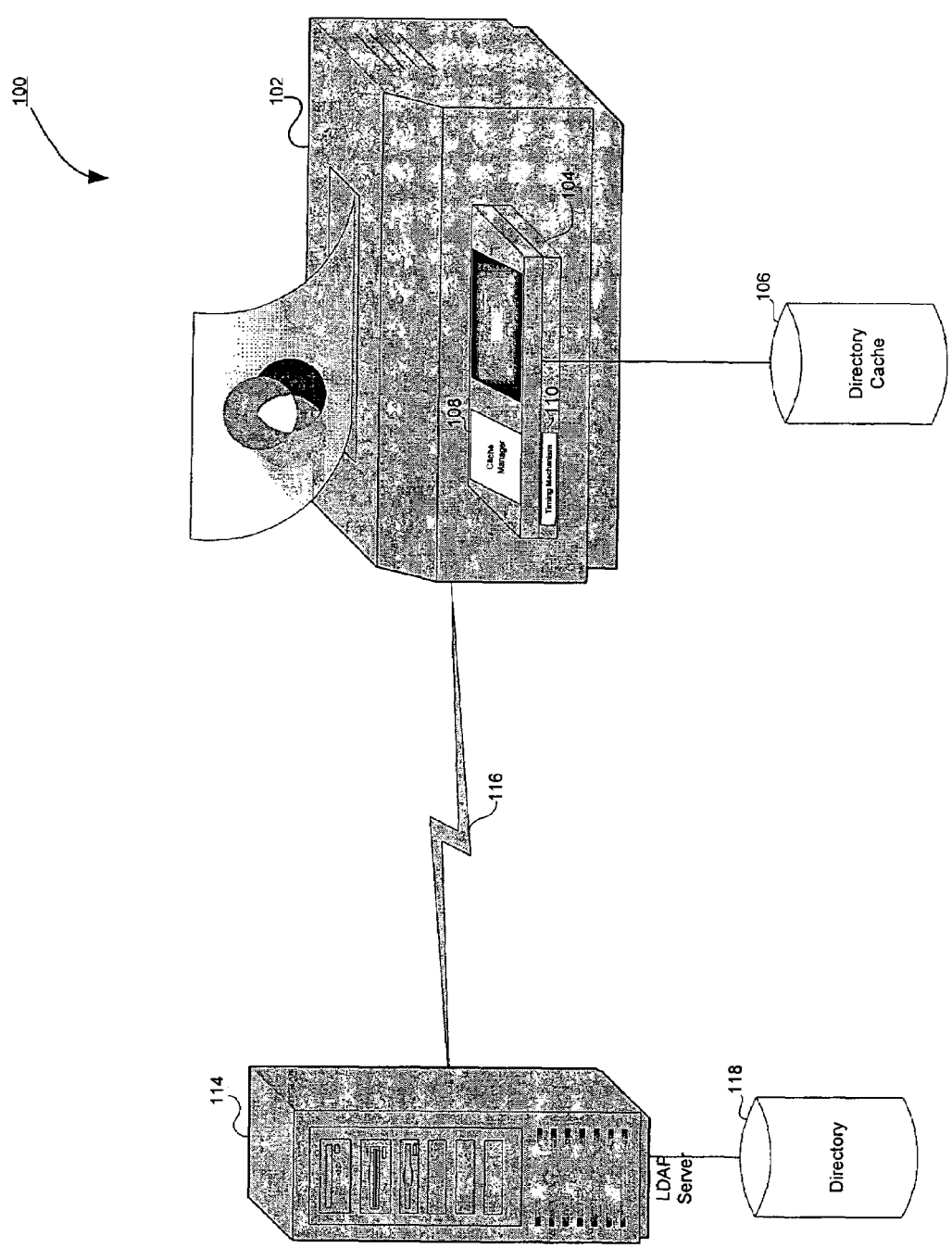
FIG. 1 is diagram illustrating the system according to the present invention.

This invention is directed to a system and method for retrieving directory data from a lightweight directory access protocol server in a networked computer environment and caching the selected directory data in a directory cache. FIG. 1 is a diagram illustrating a preferred system 100 according to the present invention. The system includes an intelligent peripheral device 102. Such intelligent peripheral is suitably a multifunctional peripheral device, copying machine, facsimile, scanning device, printing device, storage device, or workstation or terminal. The intelligent peripheral includes a controller 104 for controlling the operations of the intelligent peripheral. The controller includes a storage area for storing a directory cache 106. The controller also includes a cache manager 108 for managing the caching operations. The controller also includes a timing mechanism 110 for receiving real time or elapsed time information so as to facilitate performance of cache operations. The controller further includes a user interface 112 which allows the user to select the parameters for the caching operation as discussed below.

The intelligent peripheral is suitably connected to at least one server 114 via a communications link 116. The server is preferably a lightweight directory access protocol server. The server includes a storage area or directory 118 for storing selected contact information, electronic mail address or the like.

The subject system is particularly advantageous in office document processing environments, and will be described in reference thereto. It is to be appreciated that the subject system is advantageously used in connection with any distributed, information processing environment in which enhanced throughput and efficiency is desired. In the preferred environment, the system is employed in connection with directory services. The system will be described in connection with a preferred environment employing lightweight directory access protocol ("LDAP"). However, it is to be appreciated that the subject system is suitably used in connection with any suitable directory services system.

Figure 2:
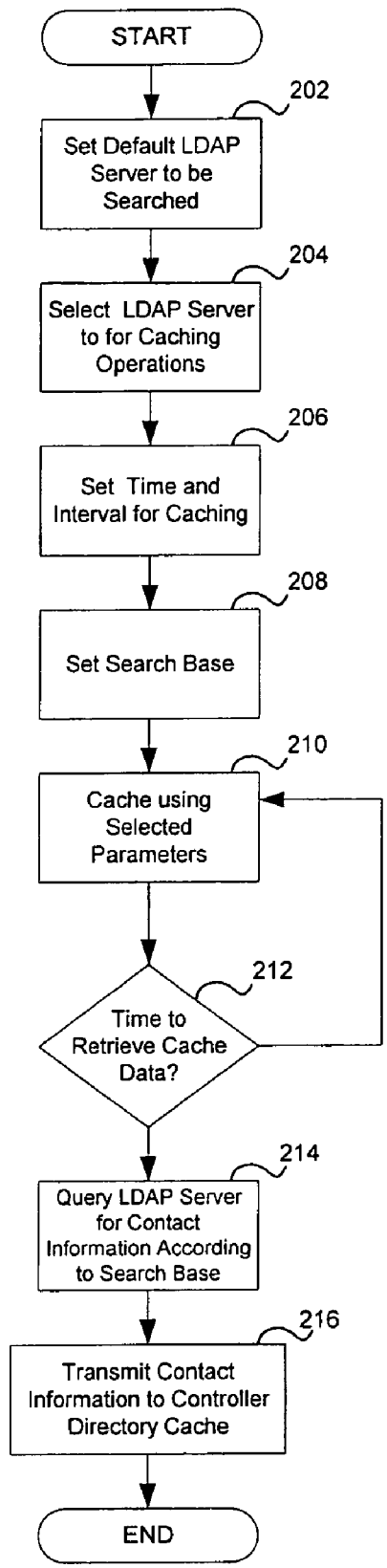
FIG. 2 is a flow chart illustrating the method according to the present invention.
Figure 3:
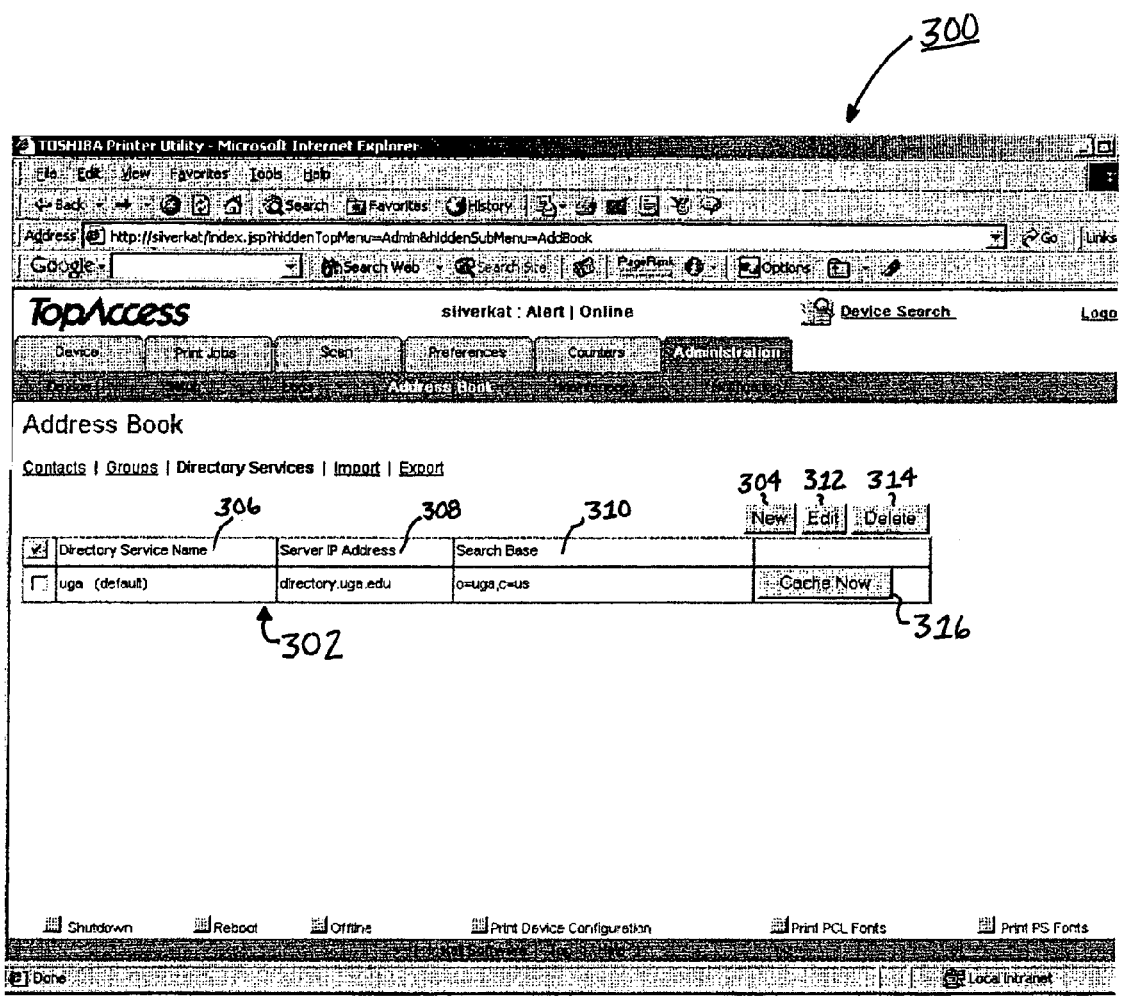
FIG. 3 is sample user interface for selecting a lightweight directory access protocol server for caching directory data in accordance with the present invention.
Figure 4:
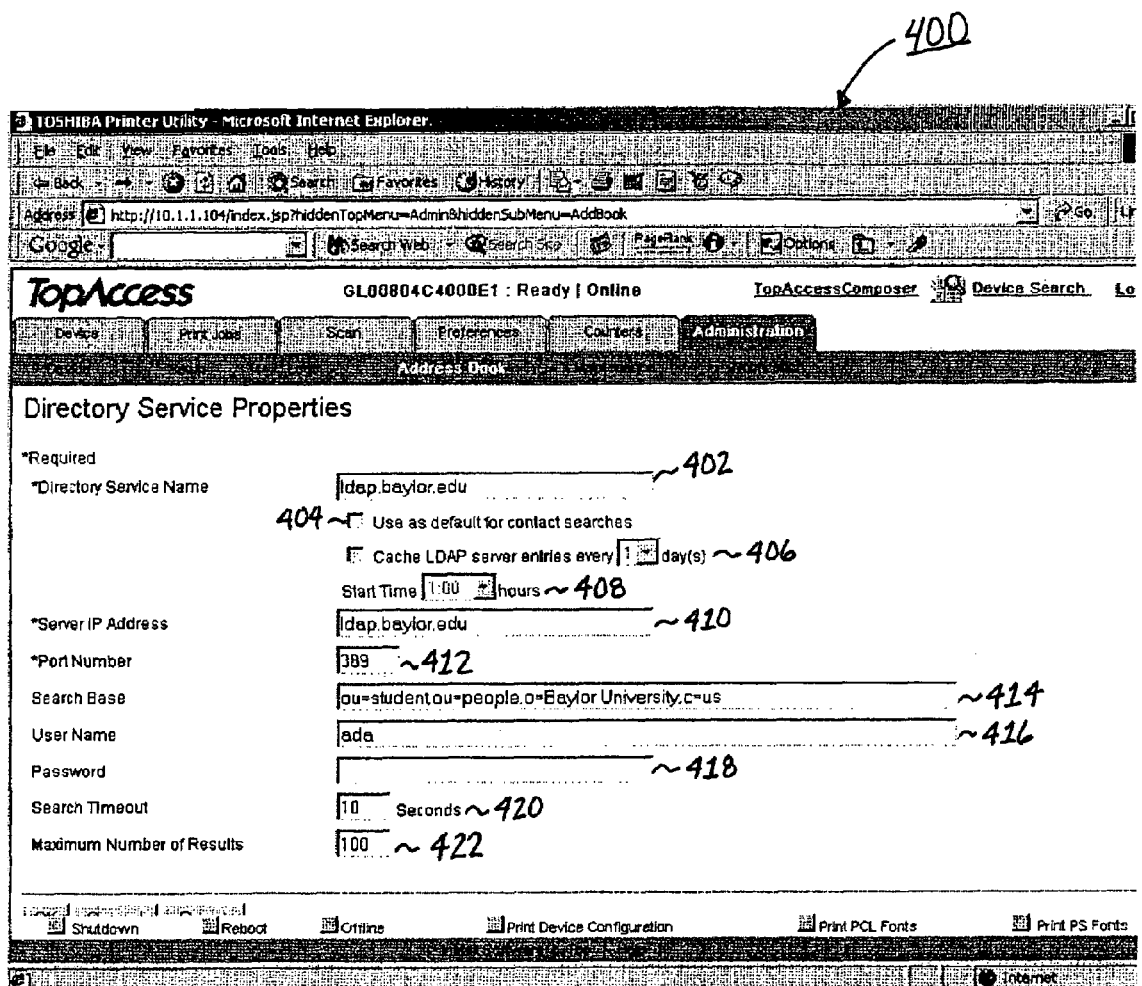
FIG. 4 is a sample user interface for selecting the parameters for the lightweight directory access protocol server for caching directory data in accordance with the present invention.

A flowchart illustrating the method according to the present invention is shown in FIG. 2. An associated user accesses a user interface via an suitable means, such as web page, to select the lightweight directory access protocol server to use for caching operations and to select the parameters for the caching operations as shown in 202. It is to be appreciated that, as disclosed herein, any user input or selection is suitably accomplished via a prompt to the user soliciting input appropriate for a particular operation. As illustrated in FIG. 2, the user first selects at least one lightweight directory access protocol server to be used in caching operations at 204. FIG. 3 illustrates a sample user interface 300 for selecting the lightweight directory access protocol server. The user has the option to select the server from a list as shown at 302. The user also has the option to enter a new server by selecting the New button 304. The user then enters the selected information, such as directory service name 306, server IP address 308, and search base 310 via any suitable means. Preferably, such information is entered via a user interface for selecting the server parameters as shown in FIG. 4 and discussed below. In addition, the user has the option to edit the parameters of a server by selecting the Edit button 312 and editing selected information via any suitable means as will be appreciated by one of ordinary skill in the art. Further, the user has the option to delete a server from the list by selecting the server and selecting the Delete button 314.

After the user has selected a default server, the user has the option to enter selected parameters for performing the caching operations. The user determines the time to perform the caching operation and the time interval at which to perform the caching operation as shown at 206. The user also determines the search base for the caching operation as shown at 208.

FIG. 4 shows a suitable user interface 400 for selecting the parameters for the caching operation. The user enters the directory service name at 402 via any suitable means. The user then selects whether this server is to be used as the default server at 404. The user then selects how often to perform the caching operation at 406 and the start time at 408. The user provides the server IP address 410, the port number 412, and the search base criteria 414. The user also provides the user name 416, user password 418, the time period for a search timeout 420, and the maximum number of results to return 422. In a preferred embodiment, this information is stored in an xml file that is accessible by the cache manager.

Once the user has selected the server and the parameters for the caching operation, flow proceeds to 210 wherein the cache manager starts the caching process in accordance with the parameters selected. In the preferred embodiment, the cache manager includes a timing mechanism for receiving real time or elapsed time information so as to facilitate performance of cache operations is detailed below. The cache manager periodically checks by any suitable means to determine if it is time to perform the caching operation to retrieve the selected information to refresh the directory cache as shown in 212. Preferably, the cache manager starts a thread that polls, at selected intervals in accordance with the timing mechanism, to determine when the caching operation is to be performed. If it is not time to perform the caching operation, the cache manager will continue to check until it is time to perform the caching operation. If it is time to perform the caching operation, flow proceeds to 214, wherein the cache manager queries the selected lightweight directory access protocol server for the contact information in accordance with the search base criteria.

The requested contact information is suitably retrieved and transmitted to the controller as shown in 216. The contact information is stored in the directory cache for use in searches requested by the user. Preferably, the contact information retrieved includes first name, middle name, last name, and electronic mail address.

In operation, the caching operation first determines if the server selected is the default server. The caching operation then determines if caching has been enabled for the selected server and if the directory cache is dirty. If the directory cache is not dirty, then the search is done against the directory cache. If the directory cache is dirty, then the search is done against the selected server.

In one embodiment, the caching operation is performed automatically at the scheduled intervals. In another embodiment, the caching operation is performed manually upon a request from the user. As shown in FIG. 3, the user selects the Cache Now 316 button and the caching operation is commenced.

In operation, the controller receives search requests or messages from users for contact information. The directory data retrieved and stored in the directory cache is used in response to such requests. Preferably, the requests are performed in the order in which they are received. If a request is received during the caching operation, the requested information is obtained by directly querying the respective LDAP server. In the event changes are made to the parameters set up for the default LDAP server while the caching operation is in progress, the caching operation is stopped. The directory cache is discarded by any suitable means and the directory cache is refreshed.

Preferably, in the event that the user makes changes to the parameters of the caching operation, the directory cache is marked as dirty until such time as the directory cache is updated at the next scheduled time. In addition, during the caching operation, the directory cache is marked as dirty.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for caching directory data in a networked computer environment comprising:

means adapted for accessing, via a web-based interface, an LDAP directory associated with a networked document processing device, which access is completed through an associated data network, and wherein the LDAP directory includes means adapted for storing a plurality of directory entries, each entry having a plurality of data fields corresponding thereto;

means adapted for generating, on the web-based interface, a prompt to an associated user for cache property data associated with the LDAP directory, which cache property data includes duration data representative of a selected, periodic cache renewal period, parameter data representative of user-specified parameters corresponding to selected data fields of each of a plurality of directory entries for which fields caching is desired, and server data representative of an identity of an associated server from which cached data is to be obtained via the data network;

means adapted for receiving cache property data via the web-based interface in accordance with a generated prompt; and means adapted for communicating received cache property data to the networked document processing device via the data network; and wherein the networked document processing device includes,
a timer data storage, which timer data storage includes means adapted for storing received duration data;
means adapted for receiving temporal data representative of elapsed time;
testing means adapted for testing the temporal data against the timer data, the testing means including means adapted for outputting a cache renewal signal in accordance with an outcome of the testing;
a directory cache;
a cache refresh means adapted for periodically updating the LDAP directory by retrieving selected directory data via the data network from a directory disposed on the associated server in accordance with parameter data and server data into the directory cache; and
means adapted for enabling the cache refresh means in accordance with the duration data.

2. The system for caching directory data in a networked computer environment of claim 1, further comprising:
means adapted for receiving a cache renewal override signal; and
means adapted for enabling the cache refresh means in accordance with the cache renewal override signal.

3. The system for caching directory data in a networked computer environment of claim 2, further comprising means adapted for an associated user to select a cache renewal override signal.

4. The system for caching directory data in a networked computer environment of claim 1, wherein the selected directory data includes data representative of contact information, and wherein the selected directory data is limited to selected portions thereof.

5. The system for caching directory data in a networked computer environment of claim 1 further comprising means adapted for receiving a selection of at least one of the directory from which data is to be retrieved and directory data to be retrieved.

6. The system for caching directory data in a networked computer environment of claim 5, further comprising means adapted to mark the directory cache as dirty when the associated user selects at least one of a different directory from which data is to be retrieved, and different directory data to be retrieved.

7. The system for caching directory data in a networked computer environment of claim 6, wherein the cache is marked as dirty until the cache refresh means retrieves the selected directory data at the next periodic cache renewal period.

8. The system for caching directory data in a networked computer environment of claim 1, further comprising means adapted for marking the cache is dirty during the retrieval of selected directory data.

9. The system for caching directory data in a networked computer environment of claim 1, further comprising:
means adapted for receiving selected search criteria for searching the directory cache;
means adapted for searching the directory cache; and
means adapted for retrieving selected data from the directory cache in accordance with the search criteria.

10. The system for caching directory data in a networked computer environment of claim 9, further comprising:
means adapted for transmitting the search criteria to at least the directory disposed on the associated server;
means adapted for searching at least the directory;
means adapted for retrieving selected data from at least the directory in accordance with the search criteria; and
means adapted for transmitting the retrieved data from at least the directory to the directory cache and populating the directory cache with the retrieved data.

11. The system for caching directory data in a networked computer environment of claim 10, wherein the search criteria is transmitted to at least the directory in the event the selected data is not stored in the directory cache.

12. The system for caching directory data in a networked computer environment of claim 10, further comprising means adapted for transmitting the retrieved directory data to a remote device.

13. A method for caching directory data in a networked computer environment comprising the steps of:
accessing, via a web-based interface, an LDAP directory associated with a networked document processing device, which access is completed through an associated data network, and wherein the LDAP directory includes means adapted for storing a plurality of directory entries, each entry having a plurality of data fields corresponding thereto;
generating, on the web-based interface, a prompt to an associated user for cache property data associated with the LDAP directory, which cache property data includes duration data representative of a selected, periodic cache renewal period, parameter data representative of user-specified parameters corresponding to selected data fields of each of a plurality of entries for which fields caching is desired, and server data representative of an identity of an associated server from which cached data is to be obtained via the data network;
receiving cache property data via the web-based interface in accordance with the generated prompt;
communicating received cache property data to the networked document processing device;
storing received duration data in a timer data storage area;
receiving temporal data representative of elapsed time;
testing the temporal data against the timer data;
outputting a cache renewal signal in accordance with an outcome of the testing;
periodically updating the LDAP directory by retrieving selected directory data via the data network from a directory disposed on the associated server in accordance with the parameter data and server data into a directory cache; and
enabling the retrieval of the selected directory data in accordance with the duration data.

14. The method for caching directory data in a networked computer environment of claim 13, further comprising the steps of:
receiving a cache renewal override signal; and
enabling the retrieval of the selected directory data in accordance with the cache renewal override signal.

15. The method for caching directory data in a networked computer environment of claim 14, further comprising the step of selecting a cache renewal override signal.

16. The method for caching directory data in a networked computer environment of claim 13, wherein the selected directory data includes data representative of contact information, and wherein the selected directory data is limited to selected portions thereof.

17. The method for caching directory data in a networked computer environment of claim 13, further comprising the step of receiving a selection of at least one of the directory from which data is to be retrieved and directory data to be retrieved.

18. The method for caching directory data in a networked computer environment of claim 17, further comprising the step of marking the directory cache as dirty when the associated user selects at least one of a different directory from which data is to be retrieved, and different directory data to be retrieved.

19. The method for caching directory data in a networked computer environment of claim 18, wherein the cache is marked as dirty until the selected directory data is retrieved at the next periodic cache renewal period.

20. The method for caching directory data in a networked computer environment of claim 13, further comprising the step of marking the cache is dirty during the retrieval of selected directory data.

21. The method for caching directory data in a networked computer environment of claim 13, further comprising the steps of:
receiving selected search criteria for searching the directory cache;
searching the directory cache; and
retrieving selected data from the directory cache in accordance with the search criteria.

22. The method for caching directory data in a networked computer environment of claim 21, further comprising the steps of:
transmitting the search criteria to at least the directory disposed on the associated server;
searching at least the directory;
retrieving selected data from at least the directory in accordance with the search criteria; and
transmitting the retrieved data from at least the directory to the directory cache and populating the directory cache with the retrieved data.

23. The method for caching directory data in a networked computer environment of claim 22, wherein the search criteria is transmitted to at least the directory in the event the selected data is not stored in the directory cache.

24. The method for caching directory data in a networked computer environment of claim 22, further comprising the step of transmitting the retrieved directory data to a remote device.

25. A computer-implemented method for caching directory data in a networked computer environment comprising the steps of:
accessing, via a web-based interface, an LDAP directory associated with a networked document processing device, which access is completed through an associated data network, and wherein the LDAP directory includes means adapted for storing a plurality of directory entries, each entry having a plurality of data fields corresponding thereto;
generating, on the web-based interface, a prompt to an associated user for cache property data associated with LDAP directory, which cache property data includes duration data representative of a selected, periodic cache renewal period, parameter data representative of user-specified parameters corresponding to selected data fields for each of plurality of directory entries for caching, and server data representative of an identity of an associated server from which cached data is to be obtained via the data network;
receiving cache property data via the web-based interface in accordance with the generated prompt;
communicating received cache property data to the networked document processing device via the data network;
storing received duration data in a timer data storage area;
receiving temporal data representative of elapsed time;
testing the temporal data against the timer data;
outputting a cache renewal signal in accordance with an outcome of the testing;
periodically updating the LDAP directory by retrieving selected directory data via the data network from a directory disposed on the associated server in accordance with parameter data and server data into a directory cache; and
enabling the retrieval of the selected directory data in accordance with the duration data.

26. The computer-implemented method for caching directory data in a networked computer environment of claim 25, further comprising the steps of:
receiving a cache renewal override signal; and
enabling the retrieval of the selected directory data in accordance with the cache renewal override signal.

27. The computer-implemented method for caching directory data in a networked computer environment of claim 25, further comprising the step of receiving a selection of at least one of the directory from which data is to be retrieved and directory data to be retrieved.

28. The computer-implemented method for caching directory data in a networked computer environment of claim 25, further comprising the steps of:
receiving selected search criteria for searching the directory cache;
searching the directory cache; and
retrieving selected data from the directory cache in accordance with the search criteria.

29. The computer-implemented method for caching directory data in a networked computer environment of claim 28, further comprising the steps of:
transmitting the search criteria to at least the directory disposed on the associated server;
searching at least the directory;
retrieving selected data from at least the directory in accordance with the search criteria; and
transmitting the retrieved data from at least the directory to the directory cache and populating the directory cache with the retrieved data.

30. The computer-implemented method for caching directory data in a networked computer environment of claim 28, wherein the search criteria is transmitted to at least the directory in the event the selected data is not stored in the directory cache.

31. The computer-implemented method for caching directory data in a networked computer environment of claim 28, further comprising the step of transmitting the retrieved directory data to a remote device.

* * * * *